(12) United States Patent
Tathgur et al.

(10) Patent No.: US 7,012,227 B2
(45) Date of Patent: Mar. 14, 2006

(54) METHOD FOR APPLYING OR REPAIRING A COATING ON A SUBSTRATE BY INDUCTIVE HEATING

(75) Inventors: Amarjit Tathgur, Brampton (CA); Dilip K. Tailor, Brampton (CA); David Seepersaud, Etobicoke (CA)

(73) Assignee: ShawCor, Ltd., Toronto (CA)

( * ) Notice: Subject to any disclaimer, the term of this patent is extended or adjusted under 35 U.S.C. 154(b) by 0 days.

(21) Appl. No.: 10/916,904

(22) Filed: Aug. 12, 2004

(65) Prior Publication Data

US 2005/0031798 A1 Feb. 10, 2005

Related U.S. Application Data

(62) Division of application No. 10/015,421, filed on Dec. 12, 2001.

(30) Foreign Application Priority Data

Dec. 15, 2000 (CA) ................................ 2328578

(51) Int. Cl.
*H05B 6/10* (2006.01)

(52) U.S. Cl. ............... 219/633; 219/634; 219/643; 219/610; 156/94; 156/272.4; 427/543

(58) Field of Classification Search ........ 219/633–635, 219/643, 649, 610–611, 617; 156/84, 86, 156/94, 272.2, 274.4; 427/543–544
See application file for complete search history.

(56) References Cited

U.S. PATENT DOCUMENTS

| 4,732,632 A | 3/1988 | Pieslak et al. |
| 4,778,948 A | 10/1988 | Fitch et al. |
| 4,818,833 A | 4/1989 | Formanack et al. |
| 4,960,611 A * | 10/1990 | Fujisawa et al. ............. 427/504 |
| 4,961,798 A * | 10/1990 | Hart et al. ..................... 156/86 |
| 5,504,308 A | 4/1996 | Shiozaki |
| 5,700,530 A | 12/1997 | Van Beersel |
| 5,720,834 A | 2/1998 | Steele et al. |
| 5,919,387 A | 7/1999 | Buckley et al. |
| 5,926,936 A | 7/1999 | Ikeda et al. |
| 6,278,096 B1 * | 8/2001 | Bass .......................... 219/635 |

FOREIGN PATENT DOCUMENTS

| EP | 0 222 643 A1 | 4/1987 |
| JP | 61100438 | 5/1986 |
| JP | 03244527 | 2/1990 |
| JP | 04007124 | 1/1992 |
| JP | 04118219 | 4/1992 |
| JP | 2001260224 | 9/2001 |

OTHER PUBLICATIONS

U.S. Appl. No. 09/684,788, filed Oct. 10, 2000, Tailor et al.

* cited by examiner

*Primary Examiner*—Philip H. Leung
(74) *Attorney, Agent, or Firm*—DeLio & Peterson, LLC; Peter W. Peterson

(57) ABSTRACT

A method of applying or repairing a coating on a substrate by inductive heating. A susceptor element is applied on the coating and the element and the substrate are inductively energized to cause the substrate and the coating to be heated. The susceptor element is removed from the heated coating before applying the coating or applying a patch to the coating.

6 Claims, 2 Drawing Sheets

METHOD FOR APPLYING OR REPAIRING A COATING ON A SUBSTRATE BY INDUCTIVE HEATING

This application is a divisional of co-pending U.S. application Ser. No. 10/015,421, filed Dec. 12, 2001.

BACKGROUND OF THE INVENTION

The present invention relates to a method for inductively heating a substrate and a coating on the substrate.

The present method overcomes problems that can arise when attempting to heat substrates having coatings, particularly relatively thick and poorly heat conductive, for example plastic coatings. For example, while it is known to employ induction heating to heat polyolefin coated pipe, difficulties can arise when the coating is relatively thick. For example, in the case of applying a covering to a weld joint in polypropylene coated pipe, with certain covering systems, it is desired to raise the temperature of the metal at the cutback portion to a minimum of 165° C., preferably about 180° C. and the exterior of the polypropylene covering to a minimum of about 145° C., but more preferably about 165° C. Where the coating is greater than about 3 mm thick, for example 6.0 mm thick or greater, it has been found that induction heating is incapable of raising the exterior surface of the polypropylene coating to the desired temperature without prolonged and intensive induction heating that tends to excessively heat the steel substrate with the result that the coating components degrade, deform and decompose.

BRIEF SUMMARY OF THE INVENTION

The present invention provides a method for heating a substrate and a coating on said substrate comprising applying on the coating a susceptor element, wherein said susceptor and substrate are inductively heatable, and inductively energizing the element and substrate to cause said substrate and coating to be heated.

With the arrangement of the invention, wherein the coating is heated from the outside through an inductively heated susceptor element, as well as from the inside through the inductively heated substrate, it has surprisingly been found that it is possible to heat the coating to a desired temperature without encountering the problems of deformation, degradation and decomposition referred to above.

Advantageously, the susceptor element may function as a mould as described in more detail in our copending International Application No. WO 02/30653 published on Apr. 18, 2002, the disclosures of which are incorporated herein by reference.

The procedure of the present invention has a number of other surprising advantages. It has been found that the procedure of the invention provides the opportunity to tailor the temperature profile of the substrate and of the coating to meet the requirements of, for example, a particular covering system as may be dictated by, for example, pipe diameter, wall thickness, coating type and coating thickness.

The inductive frequency may be such as to effect skin effect heating or may heat the substrate and susceptor element through their thickness.

BRIEF DESCRIPTION OF THE SEVERAL VIEWS OF THE DRAWINGS

The invention will be described in more detail, by way of example only with reference to the accompanying drawings.

DETAILED DESCRIPTION OF THE INVENTION

Figure 1:
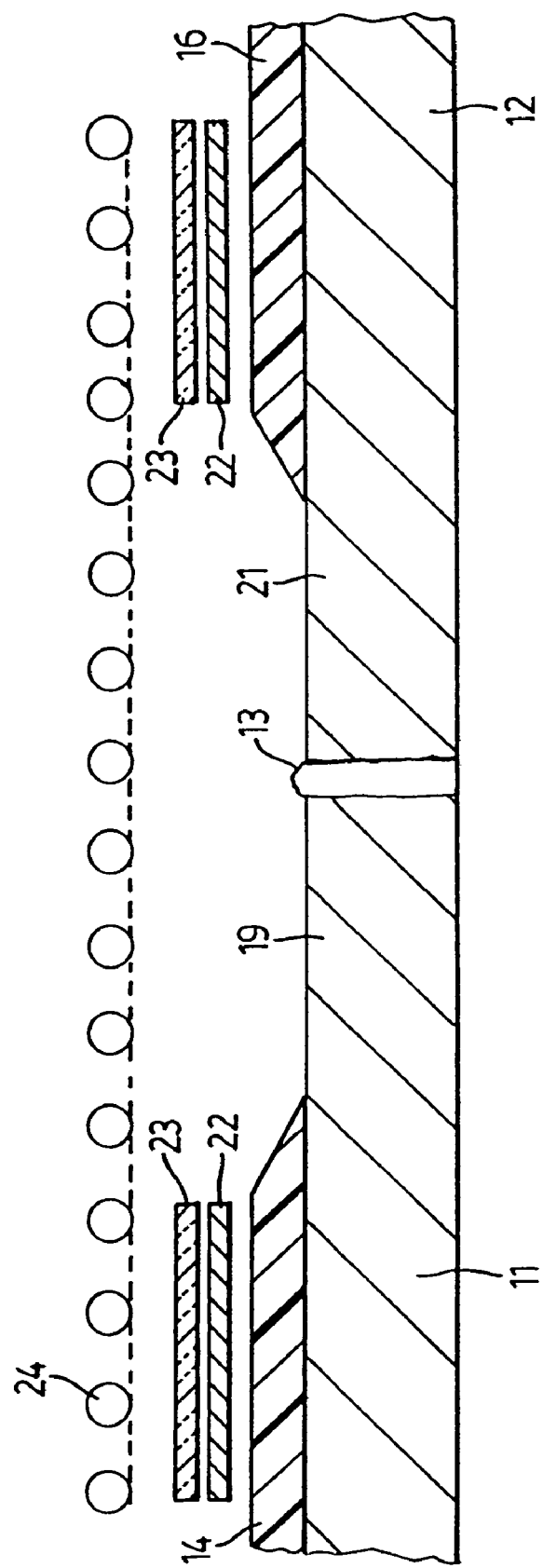
FIG. 1 is a partially schematic longitudinal cross section through a wall of a coated pipe joint in the course of application of a heat shrinkable covering.

With reference to the accompanying drawings, FIG. 1 shows by way of example pipe sections the walls 11 and 12 of which welded together at a weld joint 13. Outwardly from the joint 13, each pipe section 11 and 12 has a mainline coating 14 and 16 thereon. The main line coating may comprise a polyolefin, for example polypropylene. The pipes 11 and 12 are usually steel. End portions 19 and 21 of the pipe are bare of the coatings 14 and 16 to allow the weld to be accomplished, and are usually referred to as cut-back portions. These cut-back portions 19 and 21 may have a coating (not shown) of a curable primer composition, for example an epoxy composition. The coatings 14 and 16 may be, for example, of a multi-component type, comprising an outer polyolefin, for example polypropylene, coating on an inner polypropylene adhesive coating, the latter being applied directly on the metal pipe, or over the above-mentioned curable primer.

For the purpose of applying a heat shrink sleeve over the joint area, it is desired to heat the coatings 14 and 16 in the regions that will be overlapped by the sleeve and slightly outwardly beyond the edges of the sleeve to a temperature in excess of the activation temperature for the sleeve, for example as described in our above-mentioned International Application No. WO 02/30653 published on Apr. 18, 2002.

Over these regions, a susceptor element that, in the example shown, is in the form of a metal band 22 is placed. The metal band 22 may be, for example, a flexible metal strip that extends around the girth of the pipe, and has its ends overlapping and connected by quick release fasteners, such as toggle latches or the like. Preferably, the metal bands 22, when secured around the girth of the pipe snugly engage the outer surface of the coatings 14 and 16.

In the example shown in the drawings, a heat insulating band 23 is applied over the exterior of the metal band 22, to reduce heat loss.

Outwardly from the assembly is shown an induction coil 24.

In use, the induction coil 24 is energized in order to inductively heat the metal of the pipes 11 and 12 as well as the weld joint 13, and to heat the metal bands 22, so that the coatings 14 and 16 are heated by conduction from the bands 22 as well as from the metal of the pipes 11 and 12.

When the bare portions 19 and 21 and the coatings 14 and 16 have achieved desired temperatures, the induction coil is slid longitudinally to one side, the susceptor elements 22 and insulation bands 23 removed and a heat activatable sleeve is applied over the pipe joint area. Such sleeves and the techniques for applying them are well known to those skilled in the art, and sleeves may be applied in a conventional manner. In a preferred form, however, a sleeve may be applied as described in our above-mentioned International Application No. WO 02/30653 published on Apr. 18, 2002.

It may be noted that, during the heating operation, the metal bands 22 perform the function of moulds, serving to maintain the uniformity, continuity and profile of the coatings 14 and 16.

It is contemplated that susceptor elements in the form of structures other than bands can be employed.

Figure 3:
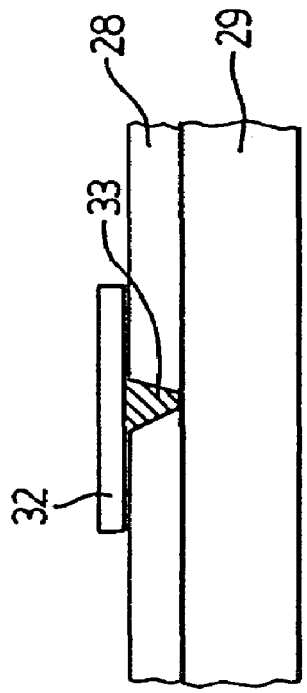
FIG. 3 shows the completed repair.
Figure 2:
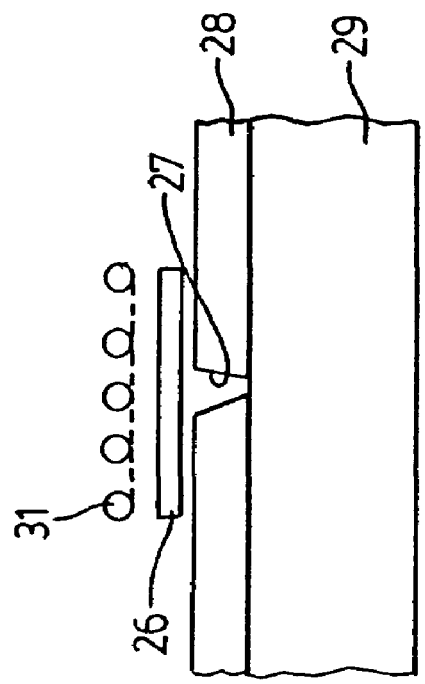
FIG. 2 is a partial cross section through a coated pipe wall showing heating of a discrete area of the wall for the purpose of application of a repair patch.

For example, referring to FIG. 2, this illustrates application of a susceptor element 26 in the course of repair of a puncture or holiday 27 in a coating 28 on a pipe wall 29. The susceptor element may be adapted for heating a discrete area and will therefore be substantially smaller in size than the girth of the pipe, but should be somewhat greater than the size of the puncture. For example, in the case in which the puncture 27 is approximately 25 mm×25 mm, the susceptor element 26 may be, for example, a metal plate approximately 50 mm×50 mm. Desirably, the susceptor element 26 has a curvature matching the curvature matching the curvature of the pipe wall 29. In use, for example, a 50 mm×50 mm metal plate having the same curvature as the curvature of the pipe wall 29 is placed over the puncture 27 and the element 26, together with the underlying portion of the pipe wall 29 is subjected to an induction field applied from an induction coil 31, thereby heating the coating 28. Once the coating 28 has been heated to a desired temperature, the susceptor element 26 and the coil 31 are removed and a repair patch comprising, for example, a polypropylene backing piece 32, as seen in FIG. 3 and having an adhesive coating on its underside is applied over the heated coating 24 and may be further heated, for example by application of hot gas, for example from a torch flame, or by pressing the repair patch with the element 26 and subjecting it to an induction field, so that the adhesive 33 is caused to melt and flow to fill the opening 27, as seen in FIG. 3. The assembly is then allowed to cool.

In order to further illustrate the present invention, Comparative Examples and an Example will be given.

COMPARATIVE EXAMPLES

Comparative Example I

A pipe joint area between polypropylene coated pipe was heated by induction heating without use of a susceptor element.

The pipe joint had the following characteristics.

| Pipe Diameter | 600 mm |
| --- | --- |
| Pipe wall thickness | 37.5 mm |
| Steel total cutback (length of portion bare of coating) | 300 mm |
| Coating length to be heated from the edge of cutback | 75 mm |
| Coating thickness | 2.5 mm |

The pipe joint area was heated using an induction coil, and the temperature of the coatings and the steel were determined using thermocouples.

The induction heating was applied until the coating surface, heated by conduction from the underlying substrate, attained a temperature of 160° C. At this point, the steel had attained a temperature of 200° C. There was some blistering and delamination of the coating, and this was prevented by use of a silicon rubber mould band wrapped around the coating as described in above mentioned International Application No. WO 02/30653 published on Apr. 18, 2002.

Comparative Example II

Comparative Example I was repeated except the thickness of the coating was 6.0 mm.

When the steel had attained a temperature of 200° C., the coating surface had reached only 90° C., and this was attributed to difficulties in heat transfer through the thick coating.

When the steel temperature was raised to 215° C., the coating surface attained 100° C. In subsequent experiments, the steel temperature was raised to as high as 250° C., and the coating temperature was raised to about 130° C., but at this point a lot of smoke was observed, the fumes being emitted from the coating. The coating outside the mould area started to blister, and the epoxy primer on the steel cutback started to degrade and emit fumes. It became clear that the required coating surface temperature could not be attained by relying on heat transfer from the metal underneath.

EXAMPLE

The procedure of Comparative Example II was repeated. However, before commencing induction heating, a 1.5 mm thick, 90 mm wide steel band was applied on the coating on each side of the cutback. Using a 400 Hz frequency on the induction coil, the steel was heated to 200° C., and the temperature of the coating under the steel band was measured using a thermocouple wire embedded in the coating at 2.0 mm depth. The coating temperature of 155° C. was measured. After the heating was completed, a polypropylene shrink sleeve was applied. It was found that during the shrinking of the sleeve with a propane torch, the coating temperature rose to 168° C. Subsequent test of the cooled sleeve showed excellent adhesion of the sleeve to the coating, as well as to the steel of the pipe wall.

More generally, an advantage of the method of the present invention is that it permits the user to manipulate and tailor the temperature profile of a weld joint and more specifically, the temperature achieved at the metal surface of the cutback and in the coating, respectively, and can accommodate variations in the characteristics of the pipeline structure, differing, for example, with respect to the pipe diameter, wall thickness, coating type and the coating thickness.

If has been found that such manipulation can be achieved by selection of various characteristics of the induction heating procedure and, more specifically, of the susceptor elements. These include the following.

1. Resistivity of the Susceptor Element

Materials such as steel with relatively higher resistivity respond more readily to the induction field and heat up much faster, as opposed to materials such as aluminium with much lower resistivity. The steel used in the above described Example was stainless steel with a resistivity of about 62 microhm-cm. Using an open circuit on the band, the desired temperatures were achieved in 6 min. at 60 KW power. The temperature profile and the heating rate can therefore be tailored by selecting a band or other susceptor element with an appropriate resistivity. Usually the susceptor element will be of metal, but it is contemplated that conductive non-metals may be employed.

2. Thickness of the Susceptor Element

The greater the thickness, the slower the temperature rise of the susceptor element. A desired differential between the rates of heating of the cutback area and of the coating can, therefore, be tailored by selecting the thickness of the susceptor element.

3. Time to Heat

By adjusting the power of the induction coil, the rate of heating can be adjusted. It has been found that, when heating is done at a slower rate, the final coating surface temperature is higher. This can be explained by the fact there is more time available for heat diffusion from the metal band (as well as from the pipe metal underneath) into the coating.

4. Insulation

A heat insulating material, such as calcium silicate or glass fibre may be placed under the susceptor element and can serve to slow down the heat transference, thereby allowing control of the temperature of the coating surface.

The above Example may be modified by employing a polytetrafluoroethylene (Teflon trade-mark) coated glass fibre fabric adhered to the bottom of the steel band. By using a fabric of different thickness, or of a different kind of texture, for example smooth versus rough texture, the temperature of the coating can be changed as desired. The Teflon (trade-mark) coated fabric provides the further advantage that it acts as a release agent, avoiding any tendency for the steel band or other susceptor element to bond to the coating.

Further, it has been found that, when the top of the susceptor element is exposed, the ambient air temperature dissipates some of the heat from the susceptor element. This can result in a significant heat loss in sub-zero conditions. Such heat loss can be reduced or avoided by placing a layer of heat insulation on top of the susceptor element. For example, a 10 mm thick calcium silicate insulation layer may be applied over the susceptor element to prevent heat loss.

5. Perforate Susceptor Element

It has been found that by reducing the mass of the susceptor element, for example by employing a susceptor element that is perforate or foraminous, the heating rate can be slowed. Examples of perforate or foraminous materials that may be used include metal wools, such as steel wool, metal mesh, for example steel mesh fabrics such as netting, and perforate susceptor elements such as perforated steel bands.

6. Open or Closed Circuit

The Example described above was carried out keeping an open circuit in the heating band. This was achieved by disposing electrical insulation between the overlapping ends of the band. In the Example above, at 60 KW, heating of the coating to 155° C. was achieved in 6 min. However, when a closed circuit was used, wherein the overlapped ends were in contact, the band heated up extremely quickly. The 155° C. temperature was achieved in 35 seconds. Hence, by using an open or a closed circuit, the heating rate can be altered significantly.

It may be noted that the use of the susceptor element in accordance with the invention includes but is not limited to the application of heat shrink sleeves. Other joint protection systems such as flame sprayed powders, heat shrink tapes and welded wrap-around polypropylene sheets, for example polypropylene sheets can be applied to substrates heated employing the method in accordance with the invention.

The invention claimed is:

1. Method of repairing an opening in a coating on a metal pipe comprising heating said coating by contacting the coating with a susceptor member comprising a susceptor element, wherein said susceptor element and pipe are inductively heatable, and inductively energizing the susceptor element and pipe to cause said pipe and coating to be heated, and thereafter removing said susceptor member from the heated coating before applying a patch.

2. Method as claimed in claim 1 comprising heating said coating to at least an activation temperature for said patch or for a coating on said patch.

3. Method as claimed in claim 1 wherein the pipe is a tubular article and the susceptor member is curved to conform to a surface curvature of the pipe.

4. Method of applying a coating or covering to a weld joint between tubular metal pipes each having a mainline coating, comprising heating said pipes and mainline coatings by contacting the mainline coatings with a susceptor member comprising a susceptor element, wherein said susceptor element and pipes are inductively heatable, and inductively energizing the susceptor element and pipes to cause said pipes and mainline coatings to be heated and thereafter removing said susceptor member from said mainline coating, before applying said coating or covering.

5. Method as claimed in claim 4 wherein said covering comprises a heat shrink sleeve and said heating method comprises heating each mainline coating adjacent the weld joint, and wherein each susceptor element comprises a band form element applied around the girth of the mainline coating of the tubular substrate adjacent the weld joint.

6. Method as claimed in claim 5 including heating each coating and substrate adjacent the weld joint to at least an activation temperature for the sleeve or for a coating on the sleeve.

* * * * *